United States Patent [19]
Carter

[11] Patent Number: 5,546,550
[45] Date of Patent: Aug. 13, 1996

[54] METHOD FOR ASSURING EQUAL ACCESS TO ALL INPUT/OUTPUT DEVICES COUPLED TO A SCSI BUS

[75] Inventor: Wilmer G. Carter, Mission Viejo, Calif.

[73] Assignee: Unisys Corporation, Blue Bell, Pa.

[21] Appl. No.: 344,204

[22] Filed: Nov. 21, 1994

[51] Int. Cl.[6] .................................................. G06F 13/14
[52] U.S. Cl. ............................................. 395/309; 395/853
[58] Field of Search ........................................ 395/306, 309, 395/310, 287, 853, 854, 855

[56] References Cited

U.S. PATENT DOCUMENTS 5,099,420  3/1992  Barlow et al. ........................... 395/299
5,426,736  6/1995  Guineau, III ............................ 395/250

Primary Examiner—Jack B. Harvey
Assistant Examiner—Glenn A. Auve
Attorney, Agent, or Firm—J. Ronald Richebourg; Mark T. Starr; Steven R. Petersen

[57] ABSTRACT

The present invention is useful in a data processing system having a data processor coupled to a SCSI channel disposed for transmitting and receiving data between the data processor and a peripheral storage subsystem having a multiplicity of disk drives. A method for assuring fair access to all disk drives connected to the SCSI channel by assigning a weighted value to I/O commands when they are issued to the SCSI device. The weighted value is determined on the basis of the length of the data to be transferred by the device. The greater the length of the data to be transferred, the larger the weighted value assigned thereto.

10 Claims, 5 Drawing Sheets

METHOD FOR ASSURING EQUAL ACCESS TO ALL INPUT/OUTPUT DEVICES COUPLED TO A SCSI BUS

FIELD OF THE INVENTION

The disclosed invention relates to the field of peripheral devices and more particularly to a method for assuring equal access to all peripheral devices connected to a host computer by means of a SCSI (Small Computer Systems Interface) bus using protocol standards.

BACKGROUND OF THE INVENTION

The widespread and growing acceptance of SCSI is largely a function of the combination of simplicity and the functionality it offers. SCSI is a bus architecture, and as such dictates a set of standard signal protocols. A bus can support up to eight separate addresses. The architecture allows for multiple host connections and peripheral devices to coexist on the same bus. With one host connected to the bus, the remaining seven addresses can be used to attach up to seven peripheral devices.

Most peripheral interfaces support a master/slave relationship, with the host as the master and the peripheral as the slave. This arrangement is satisfactory in the high end of the market where the complex disk subsystems include multiple controllers, multiple ports and multiple paths. However, these sophisticated devices are cost-prohibitive in the entry/medium computer system marketplace. SCSI can provide substantial functionality in this area because of its peer-to-peer protocol. However, as a result of this peer-to-peer protocol, low-priority devices can be "starved out" of access to the host by higher priority devices.

BRIEF SUMMARY OF THE INVENTION

It is an object of the present invention to provide a method that assures fair access to all peripheral devices connected to a single SCSI channel.

This invention provides a means for assuring access for low-priority devices coupled to a SCSI channel, as defined by the ANSI SCSI protocol when the SCSI channel is at or near saturation. The method of assuring equal access to all SCSI devices attached to a single SCSI channel is to assign a weighted value to I/O commands when they are issued to the SCSI device. The weighted value is determined on the basis of the length of the data to be transferred by the device. The greater the length of the data to be transferred, the larger the weighted value assigned thereto. The term "I/O" as used herein refers to an operation vis-a-viz a device.

This invention uses a method to restrict the issuing of commands to SCSI target devices when the initiator device has determined that the combination of commands and the transfer lengths associated with those commands will cause the SCSI channel to become saturated. The weighted values are chosen based upon data obtained by measuring the performance of a SCSI channel under varying transfer lengths to a varying number of devices. The point at which near saturation of the SCSI channel occurs (also referred to herein as the Maximum Weighted I/O Count) is established, and values are assigned to SCSI commands based upon this point. In one embodiment, the Maximum Weighted I/O Count was set to 5, which is the maximum number of devices coupled to the SCSI channel.

The present invention is useful in a data processing system having a data processor coupled to a SCSI channel disposed for transmitting and receiving data between the data processor and a peripheral storage subsystem having a multiplicity of disk drives. The present invention is a method for assuring fair access to all disk drives connected to the SCSI channel.

These and other objects, advantages, aspects and features of the present invention will be more fully understood and appreciated upon consideration of the following detailed description of one embodiment, presented in conjunction with the accompanying drawings.

DETAILED DESCRIPTION

Figure 1:
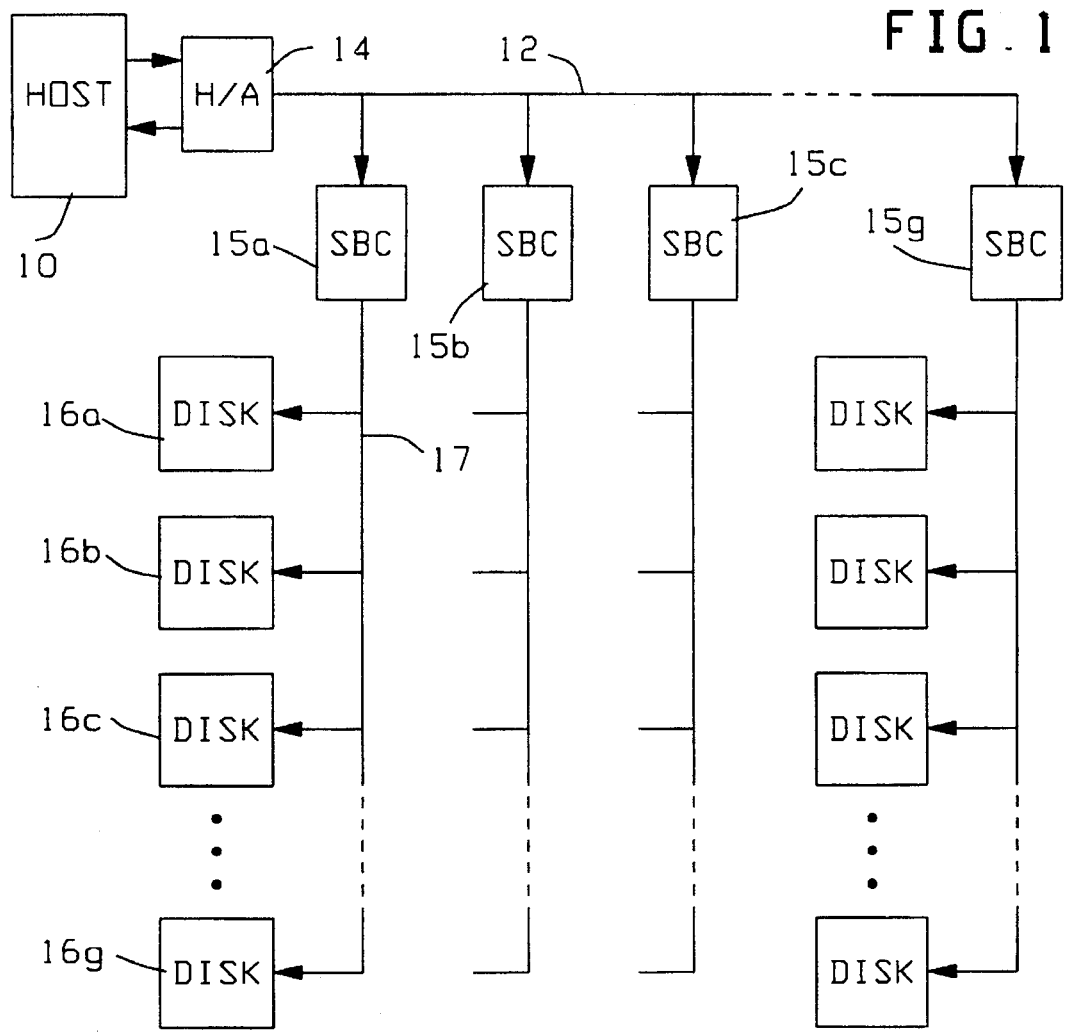
FIG. 1 is a block diagram of an expanded array of disk drives connected to a single SCSI channel wherein the method of the present invention is useful.

Referring now to the drawings and FIG. 1 in particular, a host computer 10 is coupled to a SCSI bus or channel 12 in a conventional manner by means of a host adapter 14. A plurality of SCSI Bridge Controllers ("SBC") 15a–15g are coupled to the bus 12. Details of the SBC's are described in greater detail in U.S. patent application Ser. No. 08/299,464, entitled CONTROLLER CIRCUIT FOR EXPANDING THE CAPACITY OF A SCSI BUS, filed Aug. 31, 1994, and assigned to the same assignee as this application. By use of the SBC, it is possible to increase the number of disk drives connected to a single SCSI channel by seven. In particular, disk drives 16a–16g are coupled to the SBC 15a by means of channel 17, and disk drives 18a–18f are coupled to SBC 15g by means of channel 19 with similar connections of disk drives to SBC's 15b–15f therebetween. Hence, up to forty nine disk drives can be connected to a single SCSI channel by use of the SBC.

Before continuing with the description and by way of background, the signals transmitted on the SCSI bus 12 are as follows:

ACK (ACKMOWLEDGE): Driven by the Initiator to acknowledge an Information transfer.

ATN(ATTENTION): Driven by the Initiator when connected to get the Target's attention for sending a MESSAGE OUT.

BSY(BUS BUSY): Indicates that the SCSI Bus is in use. Also, used to gain control of the Bus.

C/D(COMMAND OR DATA): Driven by the Target to indicate, the Bus Phase. In general, it indicates whether data or "other information" is being transferred.

DB(7–0) (DATA BUS): Driven by either device, as determined by the state of the I/O signal. Contains the data that is sent from one device to the other during an Information Transfer.

DB(P) (DATA BUS PARITY): Driven by either device. Contains the parity bit for the data that is sent on DB(0–7) from one device to the other during Information Transfer.

I/O (INPUT OR OUTPUT): Driven by the Target to indicate the Bus Phase. In general, I/O indicates the bus information transfer direction. I/O also determines the SELECTION and RESELECTION phases. "True/Asserted" indicates the direction from the Target to the Initiator.

NSG (MESSAGE PHASE): Driven by the Target to indicate the Bus Phase. In general, indicates whether the "other" information alluded to under C/D is a MESSAGE IN, MESSAGE OUT, COMMAND, or STATUS information.

REQ (REQUEST): Driven by the Target to request an Information Transfer.

RST (BUS RESET): Driven by any device to clear all devices from the bus. May cause "power on reset" type condition on many devices.

SEL (SELECT DEVICE): Driven by: (1) an Initiator to select a Target; or, (2) a Target to reselect an Initiator.

Figure 2:
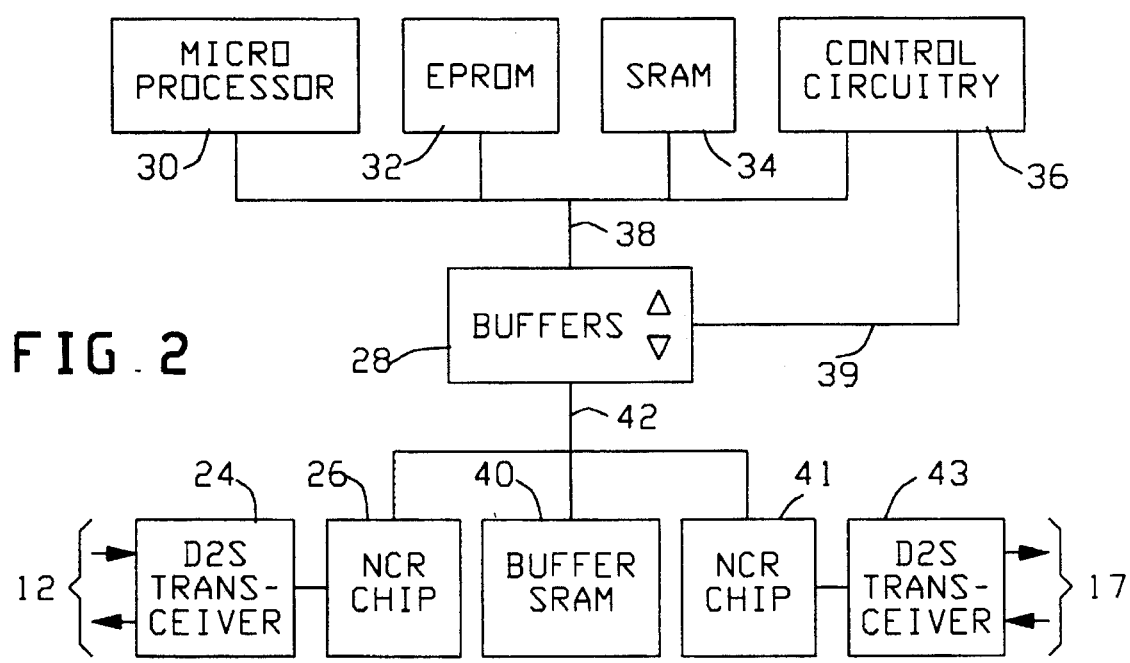
FIG. 2 is a block diagram of the SCSI Bridge Controller, a portion of which implements the method of the present invention.

Referring now to FIG. 2, a block diagram of the SBC 15a is shown. Lines 12 from the host adapter 14 are coupled to input terminals of a transceiver 24, which converts the differential signal on the SCSI channel to a single-ended format. Details of such a transceiver are disclosed in U.S. Pat. No. 5,379,405, entitled A SCSI CONVERTER WITH SIMPLE LOGIC CIRCUIT ARBITRATION FOR PROVIDING BILATERAL CONVERSION BETWEEN SINGLE ENDED SIGNALS AND DIFFERENTIAL SIGNALS, by Carl Ostrowski and assigned to the same assignee hereof. The single-ended output of the transceiver 24 is coupled to an input of a 53C720 SCSI Controller Chip 26, available from NCR Corporation, Dayton, Ohio and the output thereof is coupled to a bilateral buffer 28. The other side of the buffer is coupled to a microprocessor 30, which could be any commercially available microprocessor, however in the disclosed embodiment a 386sx-20 Microprocessor is used. This microprocessor is available from a number of suppliers including Intel Corporation of Santa Clara, Calif. Moreover, the structure and operation of microcontrollers, similar to their use herein, is explained in greater detail in a book entitled "Microcontrollers: Architecture, Implementation, and Programming" by Kenneth Hintz and Daniel Tabak and published by McGraw-Hill, Inc. of New York, N.Y.

The outputs of the buffers 28 are also coupled to data/address lines of an Electrically Erasable PROM 32, a static SRAM 34 and a control circuit 36 by means of a CPU bus 38, which in one embodiment is 16 data bits wide. The control circuit is also coupled to a directional control input of the buffers 28 by means of a line 39. The other side of the buffers 28 is coupled to data/address lines of a buffer SRAM 40 and the SCSI Controller chip 26 as well as another SCSI Controller Chip 41 by means of a DMA data bus 42. The SCSI Controller Chip 41 is coupled to another transceiver 43, which is coupled to the channel 17.

The bus 38 is independent of the bus 42 and the CPU can access the bus 42 by control signals from the control circuit 36 via the line 39, which change the direction of data flow through the buffers 28. The NCR chips 26 and 41 have their own processors with separate 32-bit wide DMA channels and compete with the microprocessor (sometimes referred to herein as the "CPU") 30 for access to the bus 42. The CPU 30 can operate independently of data flowing into or out of the SRAM 40 via the NCR chips 26 or 41.

In a typical operation, assume that the transceiver 24 is connected to the host via the lines 12, and the transceiver 43 is connected to the drive via the channel 17. Assume further that data is to be transferred from the host 10 to a drive for storage therein. The NCR chip 26 generates a signal to notify the CPU that data is arriving for storage in the SRAM 40. The CPU instructs the NCR chip 26 to receive the data and transfer it into the SRAM 40 via its 32-bit wide DMA channel (in a manner similar to a disk writing onto media). Data is transferred in bursts of eight double words at a time. The CPU may access the bus 42 between any of the bursts of data. Next, the CPU instructs the NCR chip 41 to remove the data from the SRAM 40 and transmit it through the transceiver 43 onto the channel 17. The NCR chips 26 and 41 time multiplex access to the DMA bus 42. Also, the CPU 30 can be time multiplexed onto the bus 42 to examine the chips 26 or 41 of the SRAM 40 for status information, etc.

Figure 3:
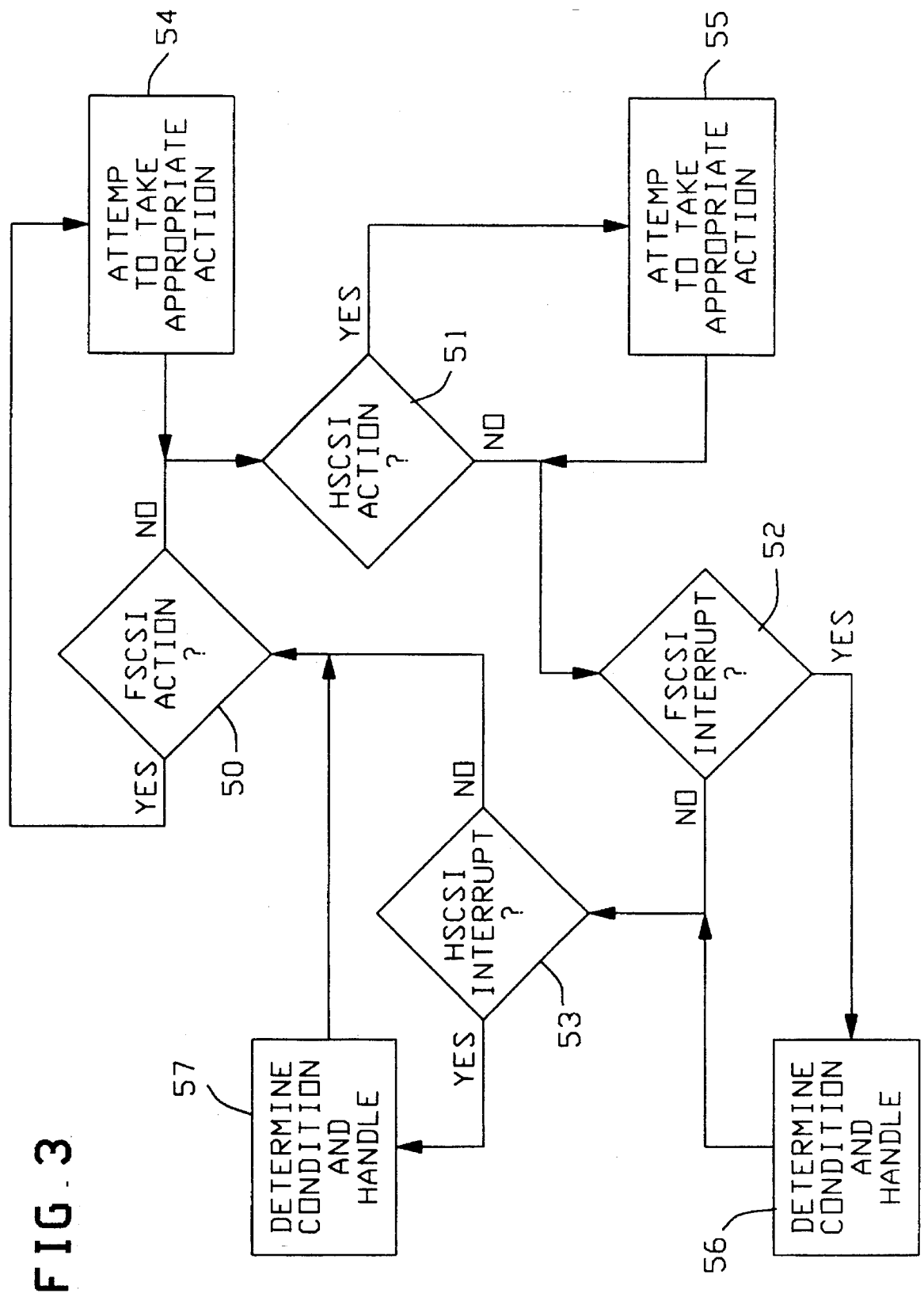
FIG. 3 is a flow chart of the CPU idle routine.

Referring now to FIG. 3, a flow chart of the CPU idle routine is shown, which is part of the C code or program running in the microprocessor 30. In general, this loop is a representation of the CPU looking for something to do. When an interrupt occurs, an action is taken. Beginning with a decision diamond 50, an inquiry is made as to whether or not the current command is an FSCSI action, i.e. disk action. If not, a branch is taken to another decision diamond 51 where an inquiry is made as to whether or not it is an HSCSI action, i.e. host action. If not, then a branch is taken to another decision diamond 52 where an inquiry is made as to whether or not this command is an FSCSI interrupt, i.e. an interrupt from the disk side SCRIPTS code. If not then a branch is made to yet another decision diamond 53 where an inquiry is made as to whether or not it is an HSCSI interrupt, i.e. an interrupt from the host side SCRIPTS code.

If the action is either an FSCSI or an HSCSI then an attempt is made to take the appropriate action as depicted by blocks 54 and 55, respectively. Likewise, if the interrupt is by either the FSCSI or the HSCSI then the condition must be determined and handled as depicted by blocks 56 and 57, respectively.

Byway of background, the code running in the NCR chips 26 and 41 is referred to herein as SCRIPTS, which will interrupt the main C program to determine which interrupt has occurred via a register value being set by the interrupt. SCRIPTS is a program assembly language designed for running in the NCR chips.

For example, if a command is applied on the bus 12, which is supplied to the NCR chip 26, the SCRIPTS code signifies to the microprocessor 30 that a command has been received. The SCRIPTS code also determines who sent the command. Operation of the SCRIPTS code is stopped at this point. The microprocessor 30 then determines the interrupt, initializes the pointers and determines the type of operation that is to be performed; that is, is it a READ or a WRITE data operation?

Figure 4:
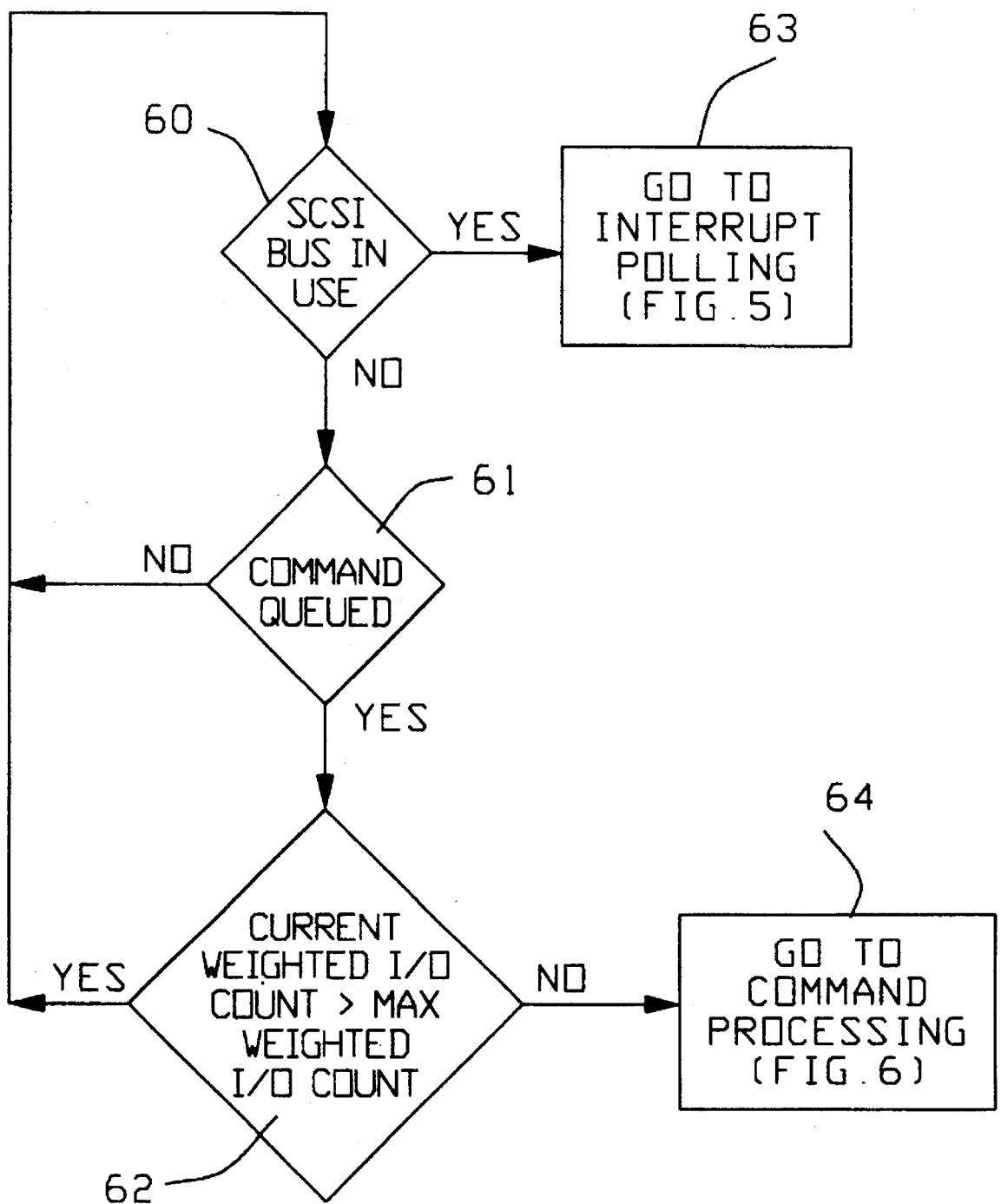
FIG. 4 is a flow chart of the main SCSI initiator polling loop.
Figure 5:
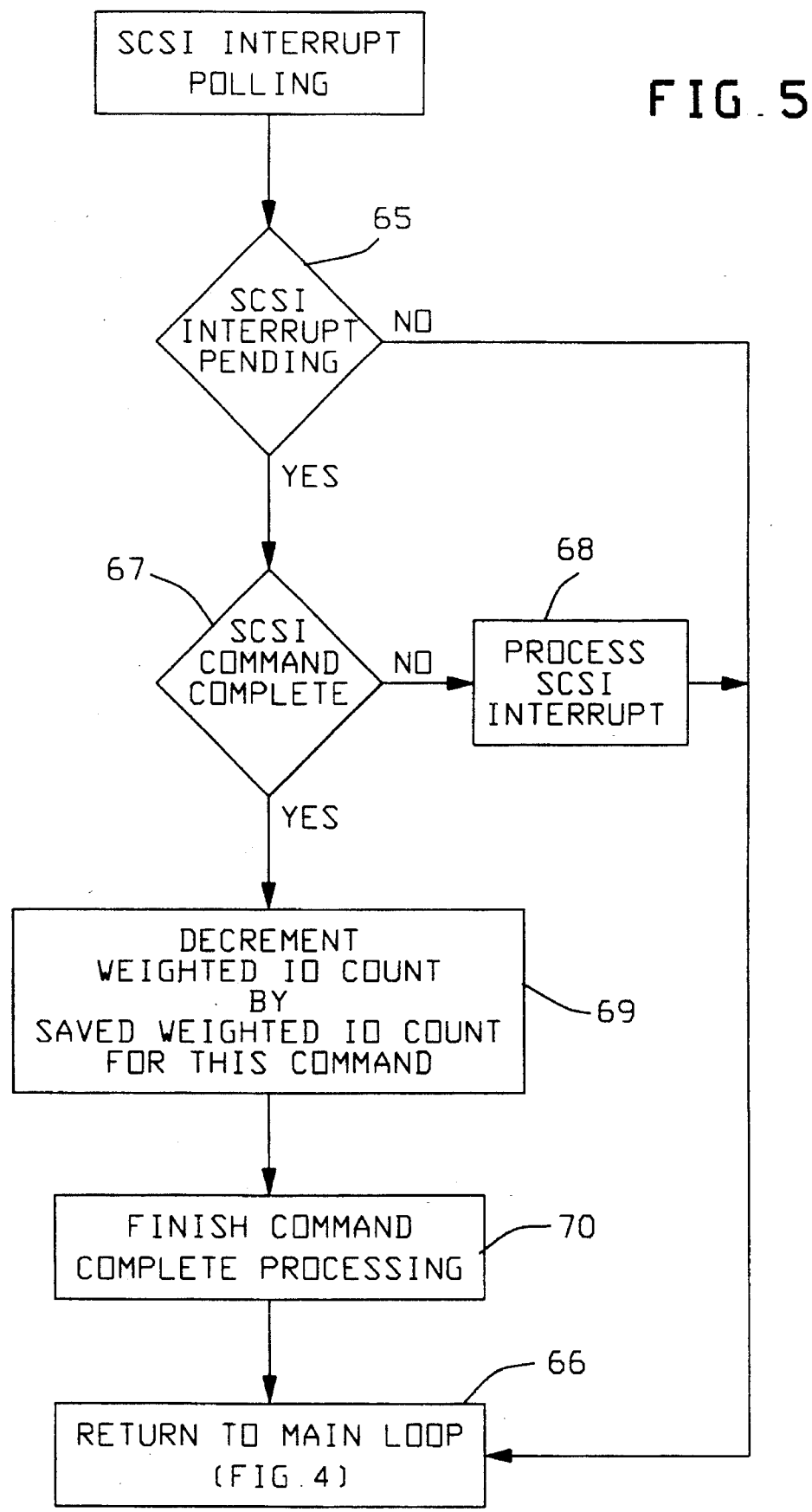
FIG. 5 is a flow chart of the SCSI interrupt polling.
Figure 6:
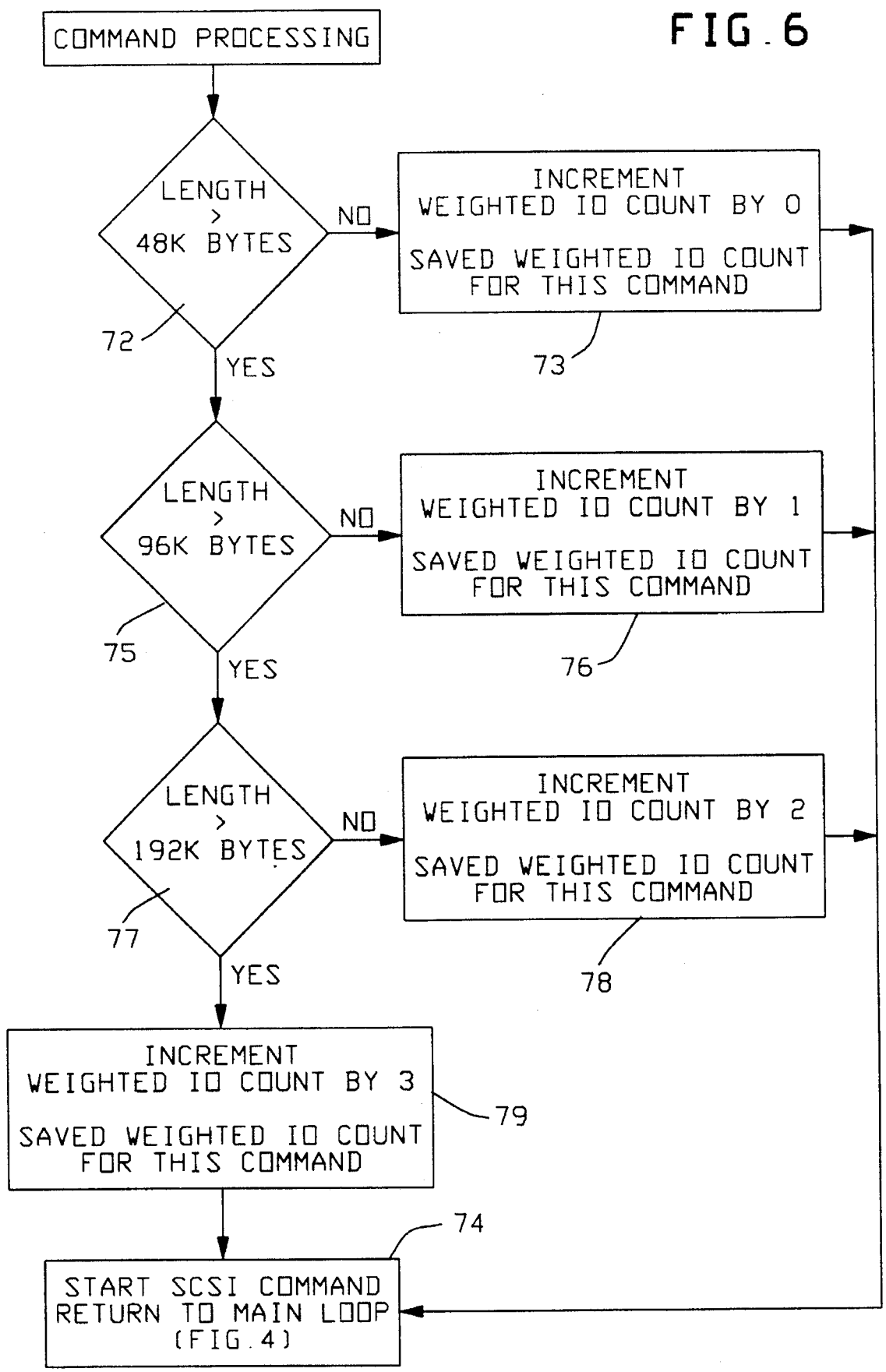
FIG. 6 is a flow chart of the command processing.

Referring now to FIG. 4, a flow chart of the main SCSI initiator polling loop is shown. This loop is a subset of, or occurs within the decision diamonds 50 and 52 of FIG. 3 hereinabove. An inquiry is made as to whether or not the SCSI bus is in use (decision diamond 60), and if so, an inquiry is made as to whether or not an interrupt is pending, process block 63 (FIG. 5). On the other hand, if the SCSI bus is not busy then a branch is made to another decision diamond 61 inquiring if a command is queued. I.e., are there any commands waiting to be sent to a drive? If no command is queued, then a return is made back to the decision diamond 60 inquiring if the SCSI bus is busy. On the other hand, if a command is queued then a branch is taken to yet another decision diamond 62; wherein the question is asked if the Current Weighted I/O Count is greater than the Maximum Weighted I/O Count. If the answer is yes then a branch is taken back to the decision diamond 60, which completes the polling loop. This loop will continue until the answer to the question in the diamond 62 is a no; whereupon a branch is taken to a command processing block 64, which process is illustrated in FIG. 6.

The decision represented by the block 62 determines when the SCSI bus will be saturated and the loop around through decision diamonds 60 and 61 will continue until the Current Weighted I/O Count is equal to or less than the Maximum Weighted I/O Count. By use of this technique commands are gated to the drive bus based upon what is deemed to be the saturation level for that bus by looking at the Weighted I/O Count.

Referring now to FIG. 5, the SCSI Interrupt Polling, or command complete process steps are shown in greater detail. Recall that as shown in FIG. 4, if the SCSI bus is in use a branch is made to interrupt polling. The first step is to inquire as to whether or not a SCSI interrupt is pending as depicted by diamond 65. If no interrupt is pending, then a branch is taken back to the main loop (FIG. 4) as represented by a process block 66. On the other hand, if an interrupt is pending then a branch is taken to another inquiry as to whether or not the SCSI command is complete as depicted by diamond 67. If the command is not complete then a branch is taken to a process block 68 depicting a process of the SCSI interrupt. Once the interrupt is processed, a branch is taken to the block 66 for a return to the main loop (FIG. 4).

If, on the other hand, the SCSI command is complete then a branch is taken to another process block 69 where the Weighted I/O Count is decremented by the saved weighted I/O count for this command. By decrementing the Weighted I/O Count at this step of the process the commands are gated to the drives (see block 62, FIG. 4). Next, the command processing is complete as depicted by a process block 70, and from this process step a return is made to the main loop as represented by the block 66.

Referring now to FIG. 6, the command processing, or command initiation process steps are shown in detail. The command to be executed is examined for the length of the data transfer. It is noted that every SCSI command has associated with it a part that specifies the length in bytes or blocks. Thus, it is possible to determine transfer length from the SCSI command. It is noted that the transfer rate in this embodiment is approximately 10 megabytes per second. Hence, when a large block of data is to be transferred, e.g. 192,000 bytes of data, the SCSI bus will be tied up for a long period of time.

The Weighted I/O Count equals the sum of all arbitrary numbers for I/O's in process. I.e., the Weighted I/O Count is a value that represents the work that has been sent to the drives for processing. When a command is complete, the Weighted I/O Count is decremented by the arbitrary number assigned to that command. Hence, the value of Weighted I/O Count goes up and down during I/O processing.

To begin the process, an inquiry is made as to whether or not the length is greater than or equal to 48,000 bytes as represented by a decision diamond 72. If the answer is no, then a branch is taken to a process block 73 where the weighted I/O count is incremented by zero (0), and this value is saved for this command. Upon completion of this step a branch is taken to a process block 74 where the SCSI command is initiated and a return to the main loop (FIG. 4) is taken.

If, on the other hand, the length is greater than or equal to 48,000 bytes then a branch is taken to another decision diamond 75 where an inquiry is made as to whether or not the length is greater than or equal to 96,000 bytes. If the answer is no then a branch is taken to a process block 76 where the Weighted I/O Count is incremented by one (1) and this value is saved for this command. Upon completion of this step a branch is taken to the process block 74 where the SCSI command is initiated and a return to the main loop (FIG. 4) is taken.

On the other hand if the length is greater than 96,000 bytes a branch is taken to yet another decision diamond 77 whereupon an inquiry is made as to whether or not the length is greater than or equal to 192,000 bytes. If the answer is no then a branch is taken to a process block 78 where the Weighted I/O Count is incremented by two (2) and this value is saved for this command. Upon completion of this step a branch is taken to the process block 74 where the SCSI command is initiated and a return to the main loop (FIG. 4) is taken.

If the length is greater than or equal to 192,000 bytes, then a branch is taken to a process block 79 where the weighted I/O count is incremented by three (3) and this value is saved for this command. Upon completion of this step a branch is taken to the process block 74 where the SCSI command is initiated and a return to the main loop (FIG. 4) is taken.

In summary, the present invention solves a problem where I/O's issued to low priority devices could take in excess of eighty seconds to complete when the SCSI bus becomes saturated with I/O's for higher priority devices. The host system will time these I/O's out when they have not been completed within the eighty seconds allowed. This invention corrected a skewing problem where high priority devices were able to complete significantly more I/O's in a given time period than the lowest priority SCSI devices once the SCSI bus became saturated. The method of this invention permitted I/O's issued to the lowest priority SCSI devices to complete an operation within six seconds on the average when they could have taken in excess of eighty seconds otherwise.

This invention employs a unique method to restrict the issuing of commands to SCSI Target devices when the Initiator has determined that the combination of commands and the transfer lengths associated with those commands will cause the SCSI bus to become saturated. Assume, for example, that saturation of the SCSI bus occurs when commands are issued to transfer greater than 200,000 bytes per command to three devices. Also assume that the system can support five devices when the Maximum Weighted I/O count is set at five, and that a value of three is assigned to commands which will transfer in excess of 200,000 bytes. Thus, when the value for the Weighted I/O count is greater than the Maximum Weighted I/O count then no more commands are issued to the devices until the Weighted I/O count is decremented below the Maximum Weighted I/O count by the completion of a device command.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for assuring equal access to all peripheral devices connected to a SCSI channel having established therefor a maximum weighted value representative of the saturation level of said SCSI channel, said method comprising the steps of:

a. examining the SCSI channel to determine if it is in use, and if not;

b. determining if commands are queued for said SCSI channel, and if yes;

c. reading a command from said SCSI channel to determine the length of data to be transferred;

d. setting a weighted value representative of the data length to be transferred; and, e. transmitting said command to said SCSI channel only when said weighted value is less than or equal to said maximum weighted value.

2. The method of claim 1 further including the step of polling said SCSI channel for an interrupt when said channel is busy in response to said step of examining.

3. The method of claim 2 where an interrupt is pending, including the steps of inquiring if the SCSI command is complete, and if so, decrementing said weighted value by a value assigned for said command and executing said command.

4. The method of claim 1 further including the steps of repeating said steps of examining and determining when said SCSI channel is not busy and no commands are queued for processing.

5. The method of claim 1 further including the step of repeating said steps of examining, determining and reading so long as said weighted value is greater than said maximum weighted value.

6. A system for assuring equal access to all peripheral devices connected to a host computer by means of a SCSI channel, comprising:

a. a processor;

b. a memory;

c. at least two peripheral devices coupled to said processor and said memory by means of a SCSI channel having established therefor a maximum weighted value representative of the saturation level of said SCSI channel;

d. software means operative in the processor for:

i. examining the SCSI channel to determine if it is in use, and if not;

ii. determining if commands are queued for said SCSI channel, and if yes;

iii. reading a command from said SCSI channel to determine the length of data to be transferred;

iv. setting a weighted value representative of the data length to be transferred; and, v. transmitting said command to said SCSI channel only when said weighted value is less than or equal to said maximum weighted value.

7. A system as in claim 6 further including the step of polling said SCSI channel for an interrupt when said channel is busy in response to said step of examining.

8. A system as in claim 7 where an interrupt is pending, including the steps of inquiring if the SCSI command is complete, and if so, decrementing said weighted value by a value assigned for said command and executing said command.

9. A system as in claim 6 further including the steps of repeating said steps of examining and determining when said SCSI channel is not busy and no commands are queued for processing.

10. A system as in claim 6 further including the step of repeating said steps of examining, determining and reading so long as said weighted value is greater than said maximum weighted value.

\* \* \* \* \*